United States Patent
Collet et al.

(12) United States Patent (10) Patent No.: US 8,229,396 B2
(45) Date of Patent: Jul. 24, 2012

(54) WIRELESS SERVICE PURCHASING SYSTEM

(75) Inventors: Jean-Luc Collet, La Gaude (FR);
Gerard Marmigere, Drap (FR);
Joaquin Picon, Riviera Baie (FR);
Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 11/090,366

(22) Filed: Mar. 25, 2005

(65) Prior Publication Data

US 2005/0216344 A1 Sep. 29, 2005

(30) Foreign Application Priority Data

Mar. 25, 2004 (EP) .................................. 04368022

(51) Int. Cl.
*H04M 1/66* (2006.01)
(52) U.S. Cl. ........ 455/410; 455/405; 455/406; 455/411; 455/41.2; 455/151.2; 340/12.51; 340/13.26
(58) Field of Classification Search .................. 455/406, 455/421, 551, 557, 558, 559
See application file for complete search history.

(56) References Cited

U.S. PATENT DOCUMENTS

| 7,917,123 | B2 * | 3/2011 | Juntunen ....................... 455/411 |
| 2002/0090913 | A1 | 7/2002 | Ritter |
| 2004/0093274 | A1 * | 5/2004 | Vanska et al. .................. 705/26 |
| 2004/0199474 | A1 * | 10/2004 | Ritter ............................ 705/65 |
| 2007/0022058 | A1 * | 1/2007 | Labrou et al. .................. 705/67 |

FOREIGN PATENT DOCUMENTS

| EP | 1489826 A1 | 12/2004 |
| JP | 09-259328 | 10/1997 |
| JP | 10-162243 | 6/1998 |
| JP | 2001-148037 | 5/2001 |
| JP | 2002-222442 | 8/2002 |
| JP | 2002-298048 | 10/2002 |
| JP | 2002-329220 | 11/2002 |
| JP | 2003-122576 | 4/2003 |

(Continued)

OTHER PUBLICATIONS

European Patent Office, "Communication Pursuant to Article 96(2) EPC", Registered Letter, pp. 1-5, Aug. 3, 2006.

(Continued)

*Primary Examiner* — Dai A Phuong
(74) *Attorney, Agent, or Firm* — Hoffman Warnick LLC; Andrea Bauer

(57) ABSTRACT

The present invention provides a wireless service purchasing system used for getting a service provided by a service provider. In one embodiment, the system comprises a mobile device including a SIM card, wherein a RFID tag is integrated, the user being identified by the same identification number in both SIM card and RFID tag. The RFID tag is adapted to communicate with a service controller booth so that the user of the mobile device be authorized to get the service. The system comprises a service provider server adapted to receive a request when it has received the identification number from the RFID tag to verify whether an account associated with the user has enough credit to gain access to the requested service and to send back a reply to the service controller booth authorizing or denying the user access to the service according to whether there is enough credit in the account.

12 Claims, 2 Drawing Sheets

FOREIGN PATENT DOCUMENTS

| | | |
|---|---|---|
| JP | 2003-162755 | 6/2003 |
| JP | 2003-244059 | 8/2003 |
| JP | 2003-298778 | 10/2003 |
| WO | 9837524 A1 | 8/1998 |
| WO | 9858509 A1 | 12/1998 |
| WO | 9900773 A1 | 1/1999 |
| WO | WO 00/74406 * | 7/2000 |
| WO | 0074406 A1 | 12/2000 |
| WO | 02/11074 A2 | 2/2002 |
| WO | 0211074 A2 | 2/2002 |
| WO | 03081934 A1 | 10/2003 |

OTHER PUBLICATIONS

Satoshi Watanabe, "Information Materials for IDS", Jan. 9, 2008, Japanese Patent Office.

Breugelmans, Jan, European Patent Office Communication, Apr. 24, 2008, 15 pages.

* cited by examiner

WIRELESS SERVICE PURCHASING SYSTEM

CROSS-REFERENCE TO RELATED APPLICATIONS

This application claims the benefit of European Patent Application No. 04368022.2, filed Mar. 25, 2004, which is hereby incorporated herein.

BACKGROUND OF THE INVENTION (1) Technical Field

The invention relates to the service purchasing systems wherein a customer has to pay a certain amount of money to access a controlled zone in order to get a specific service and in particular relates to a wireless service purchasing system.

(2) Related Art

Many services offered to customers are to be paid using coins to be inserted into a slot of a machine that generally delivers a ticket to the customer. Alternatively, in some cases a payment card such as a contactless card may be used instead of coins. This scheme wherein it is necessary to access a controlled zone to obtain the service can apply to public transportation, visiting a museum, input to a car park, using public toilets, etc.

The systems mentioned above are cumbersome insofar as they require the customer either to carry coins all the time or to manipulate a payment card. More important, they force the customer to wait in line before accessing the payment booth when several customers or users want to gain access to the service.

In some cases, the above drawbacks have been partially solved by using a wireless system known as a Radio Frequency Identification (RFID) device. Thus, the document WO 02097568 describes a system wherein a number of readers are used for reading an identification number from a RFID transponder card owned by a subscriber wanting to enter a community of retailers. But, such a system is closed, requiring prior membership, and cannot be used by anybody.

In Japanese patent application JP 2002036997, an information providing system is capable of providing information particularized to a person. A mobile phone subscriber informs the information provider about an e-mail address or a mobile phone number to become a member. The information provider stores the e-mail address or the mobile phone number in a database and distributes an RFID for recording identification information to the mobile phone subscriber who attaches the RFID to the mobile phone. When the mobile phone subscriber acquires information, he brings the mobile phone close to an RFID reader so that it can read the RFID information and transmit it to the information provider. Unfortunately, the RFID device is only attached to the mobile phone. Therefore, it is not linked to the owner of the mobile phone and can be changed.

SUMMARY OF THE INVENTION

Accordingly, the object of the invention is to provide a system wherein any customer can gain access to a service without having to carry coins or money, to manipulate a payment card or to wait in line for accessing a payment booth.

Another object of the invention is to provide a universal system wherein an RFID device linked to the mobile phone of a customer enables the customer to gain access to a controlled access area without having to wait in line for accessing a payment booth.

The invention therefore relates to a wireless service purchasing system used for getting a service provided by a service provider comprising a mobile device associated with a RFID tag, the RFID tag being adapted to communicate with a RFID reader so that the user of the mobile device is authorized to get the service. The mobile device includes a subscriber identity module (SIM) card (used in the Global System for Mobile (GSM) mobile telephone system) wherein the RFID tag is integrated, the user being identified by the same identification number in both the SIM card and the RFID tag. The system comprises a service provider server adapted to receive a request from the reader when it has received the identification number from the RFID tag to verify whether an account associated with the user has enough credit to gain access to the requested service and to send back a reply to the reader authorizing or denying access to the service according to whether there is enough credit in the account.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
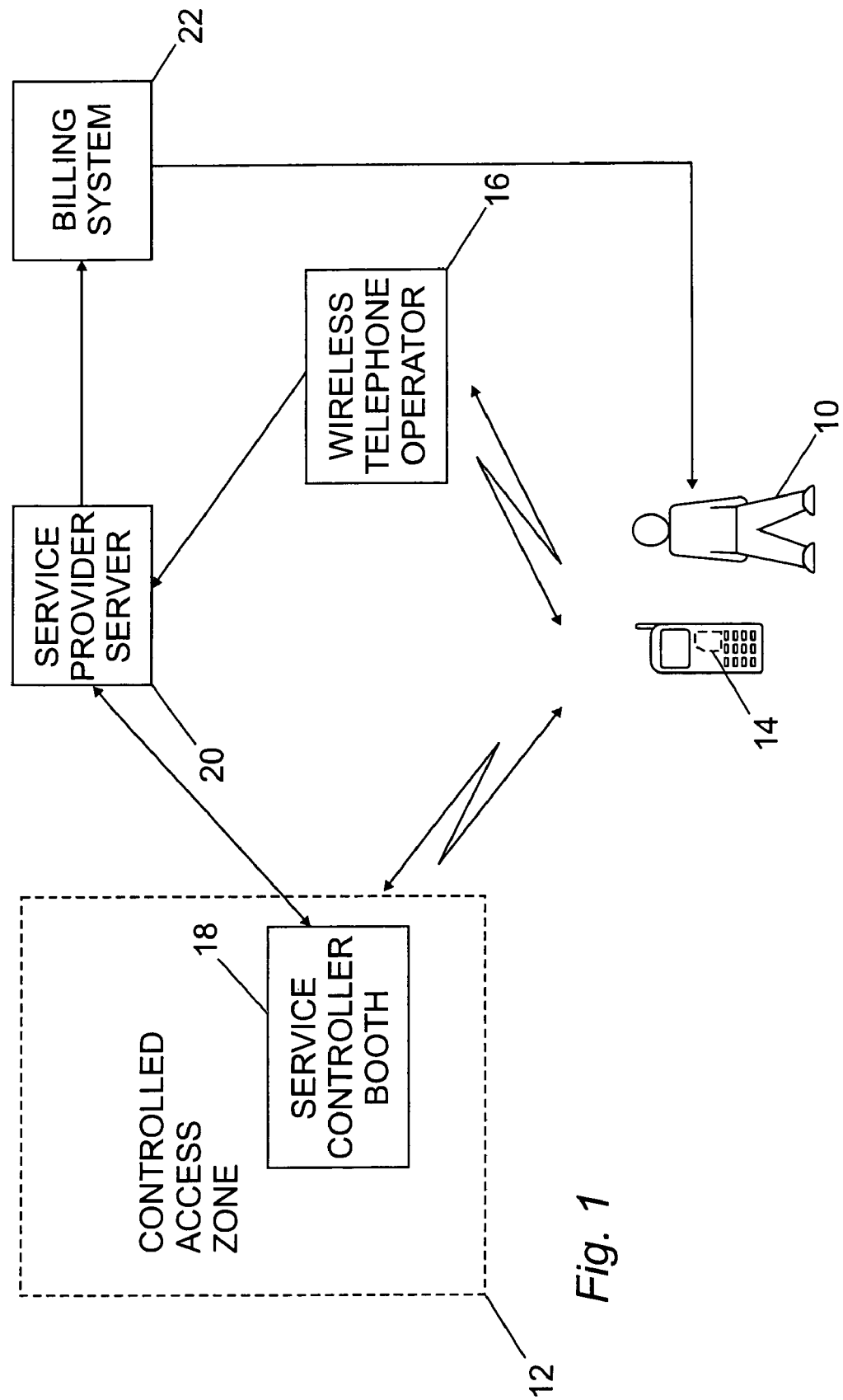
FIG. 1 is a block-diagram representing a wireless service purchasing system according to the invention.

Referring to the block-diagram represented in FIG. 1, a user or customer 10 wants to gain access to a controlled access zone 12 to get a service. Such a zone may be, for example, a transportation zone, a car park, a museum, public toilets, etc.

The user or customer 10 owns a mobile telephone set 14 which is connected to a wireless telephone operator 16 through a cellular network (not shown). It must be noted that the cellular network that is currently used today is the GSM network but could be any equivalent network such as the General Packet Radio Service (GPRS) network or the future Universal Mobile Telecommunications System (UMTS) network.

According to the invention, the mobile telephone 14 is adapted to transmit RFID information to a service controller booth 18 located at the entrance of the controlled access zone 12, when the user is located near the booth.

The service which can be obtained within the controlled access zone 12 provided by a service provider who is represented by a service provider server 20 to which a request is sent from the service controller booth when it receives the information from the mobile telephone 14. The service provider server 20 has access to the user's account and can determine whether the credit of the user or customer 10 is sufficient to authorize the user or customer to enter the controlled access zone 12. According to a preferred embodiment of the invention, the account is credited by the user 10 through the wireless telephone operator 16. Note that the account to be used can be the account at the disposal of the user 10 for accessing the services of the wireless telephone operator 16.

When the user's account is sufficient to authorize the user to gain access to the controlled zone, the authorization is sent back by the service provider server 20 to the service controller booth 18. At the same time, the service provider server 20 sends information about the bill to be established to a billing system 22 which sends the bill corresponding to the service price to the user or customer 10.

Figure 2:
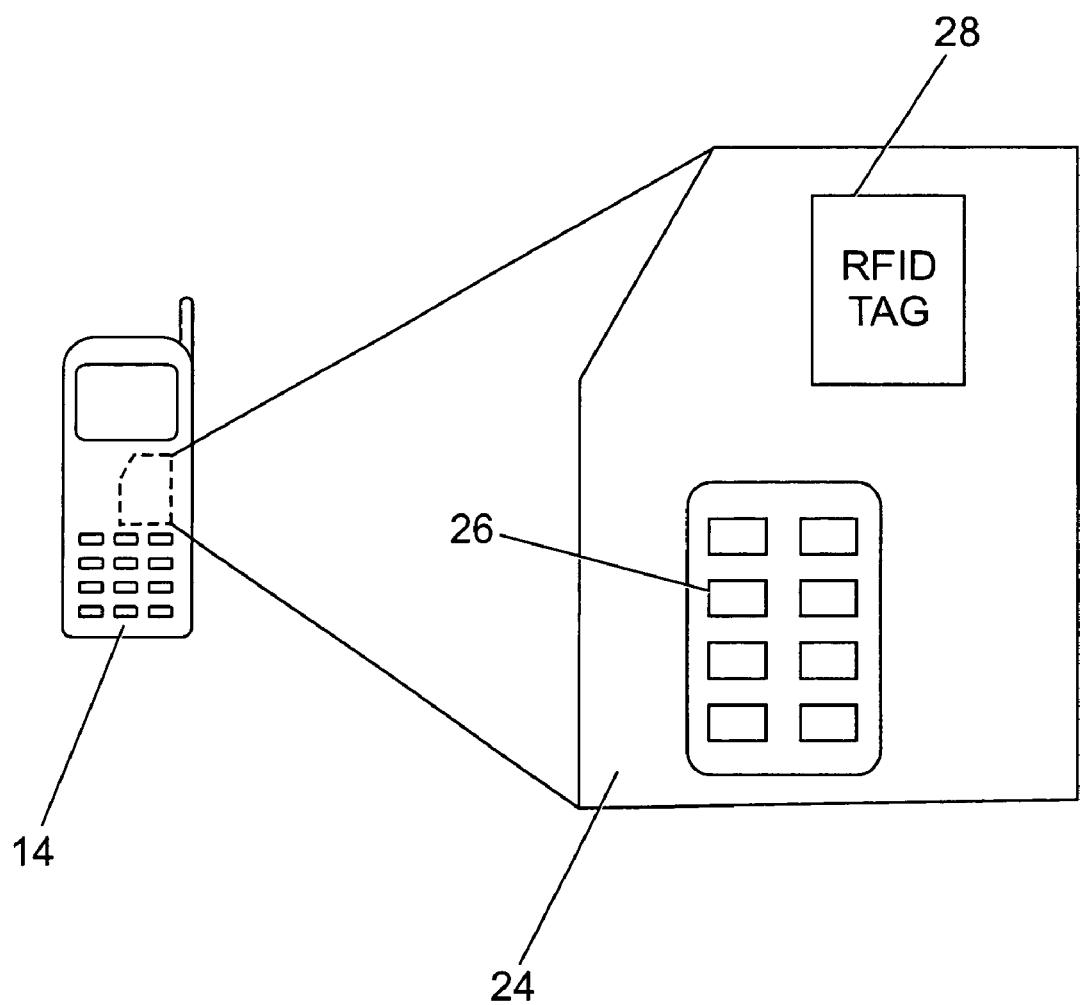
FIG. 2 is a schematic representation of the SIM card of the mobile telephone set incorporating a RFID tag.

In more detail, the mobile telephone 14 owned by the user 10 is illustrated in FIG. 2. It includes a subscriber Identify Module (SIM) 24 which is a removable component of the mobile telephone that keeps the user/subscriber's specific information including security and user's identification in integrated circuits 26. In particular, it keeps the International Mobile Subscriber Identity (IMSI), a 15 digit unique (worldwide) number allocated by the Wireless Telephone Operator to the subscriber and used for internationally identifying him/her. The IMSI is a fundamental feature of the system since it identifies a telephone user as a subscriber and it is used for identifying him/her when roaming in foreign countries.

According to the invention, a RFID tag 28 is integrated in the SIM card and configured together with the SIM by the operator when the SIM card 24 is personalized for the user, that is when the IMSI is written into the SIM card. Thus, the RFID tag 28 is configured to transmit a unique identifier which is the IMSI number. It is this number that is transmitted wireless to the service controller booth 18 when the user or customer 10 wants to gain access to the controlled access zone 12 and passes in front of the booth. When the booth 18 receives the IMSI number, it 20 sends it via a GSM (or GPRS) connection or any other network connection to the service provider server 20 and the information about the cost of the consumed service. In turn, the service provider server 20 verifies whether the account corresponding to the IMSI has enough credit and sends the corresponding (positive or negative) response to the service controller booth 18. On receipt of this response, the booth allows or denies the customer the requested service.

In case of refusal of the service, the customer 10 can send an SMS to the service provider server 20 via the wireless telephone operator 16 to refill his/her account and then reattempt access to the service. According to an alternative embodiment, the user can pay directly to the service controller booth 18 as he/she has been identified through his/her IMSI. For instance, he/she can enter on the keyboard of the booth a personal identification number (PIN) code confirming his/her payment. The booth sends the information of the transaction to the service provider server 20 that in turn transmits it to the telephone operator 16 for charging the corresponding amount on the user's telephone bill.

It must be noted that, according to another aspect of the invention, the user can, at any time (e.g. the day before he/she travels to a foreign country where he/she intends to buy some services) send an SMS with the mobile telephone 14 to the service provider server 20. This SMS will include his/her IMSI and an amount of money he/she wants to put on his/her account.

The main advantages of the invention that is described above are the following:
1. this system allows a user to consume various public services without having to stop a long time at the payment booth for making the payment,
2. the cost of the service is electronically charged to the customer and can be billed by his/her wireless telephone service provider,
3. the customer controls the expense by re-filling his/her account using a wireless telephone, insuring that the bill related to the cost of the service cannot exceed the amount of money he/she has preloaded,
4. the system works in any country where the GSM network (or GPRS/UMTS) is operating. As a matter of fact, it takes advantage of the roaming capability of the system,
5. the customer is automatically identified by the wireless telephone operator allowing the service provider to use all its existing infrastructure, in particular billing of the services.
6. The user may change his/her telephone set since he/she has just to insert the SIM card in the new mobile telephone.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

The invention claimed is:

1. A wireless service purchasing system for getting a service provided by a service provider comprising:
a radio frequency identification (RFID) tag;
an RFID reader;
a mobile device associated with the radio frequency identification (RFID) tag, the RFID tag being adapted to communicate with the RFID reader so that a user of the mobile device may be authorized to access the service;
a subscriber identity module (SIM) card, wherein the RFID tag and SIM card are integrated, the user being identified by the same identification number in both the SIM card and the RFID tag; and
a service provider server for receiving a request from the RFID reader when it receives the identification number from the RFID tag and verifying whether an account associated with the user has enough credit to gain access to the requested service and sending a reply to the RFID reader authorizing or denying access to the service according to whether there is enough credit in the account.

2. A system according to claim 1, wherein the user may send a short message service (SMS) to the service provider server including the identification number and an amount of money to be put in an account associated with the user.

3. A system according to claim 2, wherein the account associated with the user is an account for accessing the services of a wireless telephone operator from the mobile device.

4. A system according to claim 3, wherein the user may pay directly at a service controller booth by entering on a keyboard a PIN code confirming payment and the service controller booth sends information about the payment to the service provider server.

5. A wireless service purchasing system for getting a service provided by a service provider comprising:
a radio frequency identification (RFID) tag;
an RFID reader;
a mobile device associated with the radio frequency identification (RFID) tag, the RFID tag being adapted to communicate with the RFID reader so that a user of the mobile device may be authorized to access the service;
a subscriber identity module (SIM) card, wherein the RFID tag and SIM card are integrated, the user being identified by the same identification number in both the SIM card and the RFID tag;
a service provider server for receiving a request from the RFID reader when it receives the identification number from the RFID tag and verifying whether an account associated with the user has enough credit to gain access to the requested service and sending a reply to the RFID reader authorizing or denying access to the service according to whether there is enough credit in the account; and a billing system for transmitting a bill to the user after receiving information about the price of the service accessed by the user.

6. A system according to claim 5, wherein the user may send a short message service (SMS) to the service provider server including the identification number and an amount of money to be put in an account associated with the user.

7. A system according to claim 6, wherein the account associated with the user is an account for accessing the services of a wireless telephone operator from the mobile device.

8. A system according to claim 7, wherein the user pays directly at a service controller booth by entering on a keyboard a PIN code confirming payment and the service controller booth sends information about the payment to the service provider server.

9. A wireless service purchasing system for getting a service provided by a service provider comprising:
   a radio frequency identification (RFID) tag;
   an RFID reader;
   a mobile device associated with the radio frequency identification (RFID) tag, the RFID tag being adapted to communicate with the RFID reader so that a user of the mobile device may be authorized to access the service;
   a subscriber identity module (SIM) card, wherein the RFID tag and SIM card are integrated, the user being identified by the same identification number in both the SIM card and the RFID tag;
   a service provider server for receiving a request from the RFID reader when it receives the identification number from the RFID tag and verifying whether an account associated with the user has enough credit to gain access to the requested service and sending a reply to the RFID reader authorizing or denying access to the service according to whether there is enough credit in the account; and
   a service controller booth, at which a user may pay by entering on a keyboard a PIN code confirming payment and which sends information about the payment to the service provider server.

10. The system of claim 9, wherein the user may send a short message service (SMS) to the service provider server including the identification number and an amount of money to be put in an account associated with the user.

11. A system according to claim 10, wherein the account associated with the user is an account for accessing the services of a wireless telephone operator from the mobile device.

12. A system according to claim 9, further comprising a billing system for transmitting a bill to the user after receiving information about the price of the service accessed by the user.

* * * * *